United States Patent [19]

Medford et al.

[11] Patent Number: 5,827,923
[45] Date of Patent: Oct. 27, 1998

[54] ABRASION RESISTANT, CURABLE HARDCOATING COMPOSITIONS AND TINTED ARTICLES MADE THEREFROM

[75] Inventors: George F. Medford, Ballston Lake; Gregory R. Gillette, Clifton Park, both of N.Y.; Norio Sato, Ohta, Japan

[73] Assignee: General Electric Company, Waterford, N.Y.

[21] Appl. No.: 781,704

[22] Filed: Jan. 10, 1997

Related U.S. Application Data

[62] Division of Ser. No. 422,368, Apr. 14, 1995, Pat. No. 5,614,321.

[51] Int. Cl.$^6$ .................................................. C08L 35/00
[52] U.S. Cl. .................................................. 524/854
[58] Field of Search ................................................ 524/854

[56] References Cited

U.S. PATENT DOCUMENTS

| | | |
|---|---|---|
| 4,348,462 | 9/1982 | Chung . |
| 4,417,790 | 11/1983 | Dawson et al. . |
| 4,455,205 | 6/1984 | Olson et al. ................. 204/159.13 |
| 4,486,504 | 12/1984 | Chung . |
| 4,547,397 | 10/1985 | Burzynski et al. . |
| 4,644,077 | 2/1987 | Gupta . |
| 4,973,612 | 11/1990 | Cottington et al. . |
| 5,013,608 | 5/1991 | Guest et al. . |
| 5,102,695 | 4/1992 | Guest et al. . |
| 5,126,394 | 6/1992 | Revis et al. . |
| 5,188,900 | 2/1993 | Revis et al. . |
| 5,221,560 | 6/1993 | Perkins et al. . |
| 5,232,964 | 8/1993 | Evans et al. . |
| 5,296,295 | 3/1994 | Perkins et al. . |
| 5,374,483 | 12/1994 | Wright . |

*Primary Examiner*—Joseph L. Schofer
*Assistant Examiner*—W. Co Cheng
*Attorney, Agent, or Firm*—Kenneth S. Wheelock

[57] ABSTRACT

This invention provides a coating composition which utilizes a free radical initiator and an organic tintability additive which remains substantially unpolymerized even after the remainder of the coating composition is cured. Superior tintability and adhesion to polycarbonate makes this coating particularly suitable for making tinted opthalmic lenses.

20 Claims, 5 Drawing Sheets

ABRASION RESISTANT, CURABLE HARDCOATING COMPOSITIONS AND TINTED ARTICLES MADE THEREFROM

This is a divisional of application Ser. No. 08/422,368 filed on Apr. 14, 1995, now U.S. Pat. No. 5,614,321.

BACKGROUND OF THE INVENTION

The present invention relates to a coating composition, which when applied to a substrate, forms a protective, abrasion-resistant coating thereon, and which coated substrate has been found to be readily tintable. More particularly, the present invention relates to a colloidal silica coating composition employing a free radical initiator and an organic tintability additive which remains substantially unpolymerized even after the remainder of the coating composition is cured onto the substrate.

It is known in the art that colloidal silica can be included in abrasion-resistant coating compositions, also referred to as hardcoating compositions. Examples of such colloidal silica hardcoating compositions are Chung U.S. Pat. No. 4,348,462; Perkins et al. U.S. Pat. No. 5,221,560; and Perkins et al. U.S. Pat. No. 5,296,295.

Chung U.S. Pat. No. 4,348,462 discloses a colloidal silica hardcoat composition. Chung also discloses that additives, such as pigments or dyes, can be added to the composition. The present invention relates to a change in color or light transmittance brought about by adding a color additive, e.g. dye, after the composition already has been cured onto a substrate, not by adding the color additive to the coating composition before curing.

Perkins et al. U.S. Pat. Nos. 5,221,560 and 5,296,295 disclose a tintable hardcoat composition but the tintable additive in Perkins et al. is polymerized. In addition, the Perkins et al. patents refer to cationic-type initiators, used alone or in combination with a free radical initiator. The Perkins et al. patents do not disclose the use of a free radical initiator alone. The present invention, on the other hand, requires only a free radical initiator. Further, the tintability additive of this invention remains substantially unpolymerized. It has been discovered that the compositions of this invention result in improved tintability without any appreciable loss in abrasion resistance.

SUMMARY OF THE INVENTION

The present invention provides a novel coating composition for substrates.

This invention provides a coating composition which, when cured onto a substrate, applies an abrasion-resistant surface thereto and which can then still be tinted.

This invention also provides a coating composition which, when cured onto a substrate, and subsequently tinted, results in improved tintability without any appreciable loss in abrasion resistance.

This invention further provides a coating composition which utilizes a free radical initiator and an organic tintability additive which remains substantially unpolymerized even after the remainder of the coating composition is cured.

This invention provides a novel process utilizing a new coating composition for obtaining a tinted substrate.

Further, this invention also provides a tinted article made by the novel process.

The curable coating composition of this invention comprises:

(A) an effective amount of a non-volatile colloidal silica;

(B) an effective amount of an acrylate or methacrylate compound, containing at least one functional group capable of reacting with the colloidal silica;

(C) an effective amount of at least one monomer which contains two or more functional groups selected from the group consisting of acryloxy and methacryloxy groups;

(D) a catalytic amount of a free radical initiator; and (E) an organic tintability additive which remains substantially unpolymerized even after the remainder of the coating composition is cured.

A tinted article is made by applying this coating composition to the surface of a substrate, curing the coating composition on the surface of the substrate by exposure to radiant energy or heat and then applying to the coated surface a color additive, e.g., dye. As described, despite curing the coating resin matrix, the organic tintability additive remains substantially unpolymerized.

DETAILED DESCRIPTION OF THE INVENTION

Figure 1:
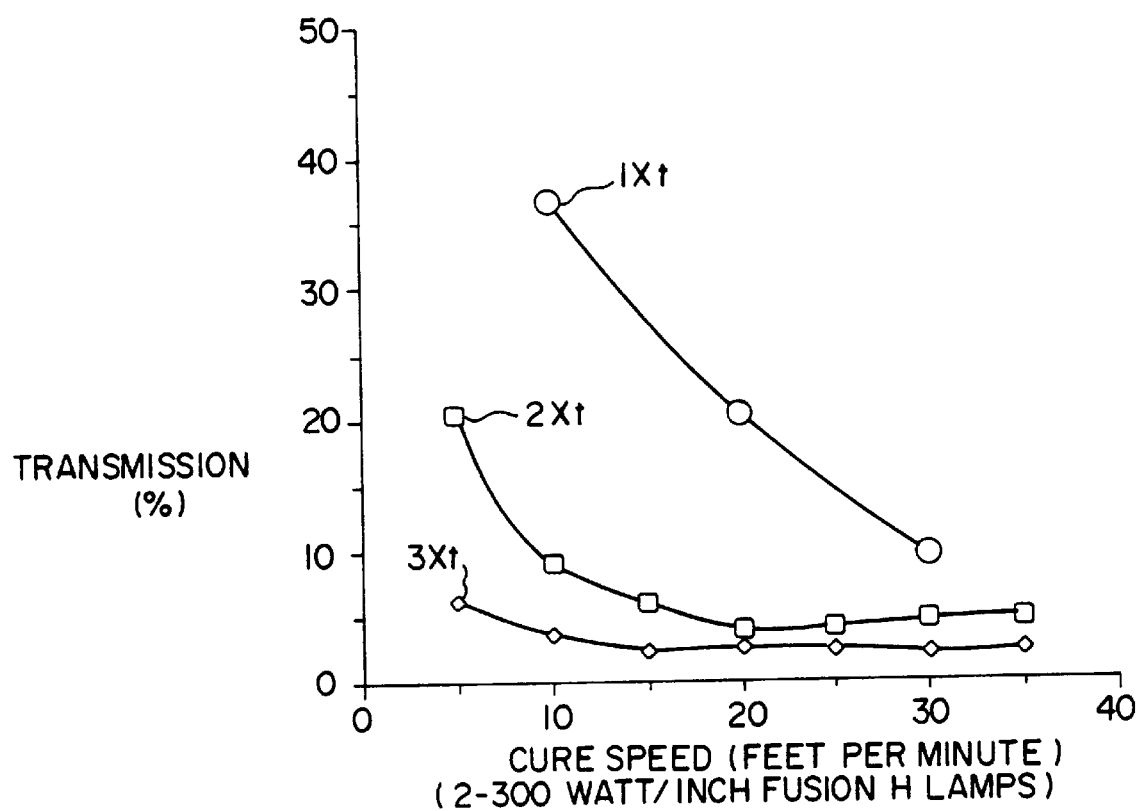
FIG. 1 is a graphical representation of the tintability data of Example 198.

The coating compositions of this invention are made by mixing (A) an effective amount of non-volatile colloidal silica; (B) an effective amount of an acrylate or methacrylate compound, containing at least one functional group capable of reacting with the colloidal silica; (C) an effective amount of at least one monomer which contains two or more functional groups selected from the group consisting of acryloxy and methacryloxy groups; (D) a free radical initiator, and (E) an organic tintability additive.

The first component (A) is colloidal silica. Any colloidal silica which is non-volatile can be used. Colloidal silica is ordinarily sold in dispersion form, for example, Nalco 1034. Nalco 1034A is an acidic colloidal silica in water containing 34.1% $SiO_2$. Other commercially available acidic colloidal silicas include IPA-ST and MA-ST colloidal silicas from Nissan Chemical Industries Ltd. which are 30% $SiO_2$ in isopropyl alcohol and methanol respectively. Nalco 1057 available from Nalco Chemical Company is 30% $SiO_2$ in propyl cellosolve.

Alkaline colloidal silicas are also useful in the present invention provided that before addition to the coating formulation the pH is adjusted to below 6 as, for example, set forth in Gupta U.S. Pat. No. 4,644,077 which is hereby incorporated by reference.

The second component (B) is an effective amount of an acrylate or methacrylate, containing at least one functional group capable of reacting with the colloidal silica. An Example is 3-methylacryloxypropyl trimethoxysilane. Further examples of these silanes include:

3-acryloxypropylmethyldiethoxysilane 3-acryloxypropylmethyldimethoxysilane 3-acryloxypropyltrimethoxysilane 2-methacryloxethylmethyldiethoxysilane
2-methacryloxyethylmethyldimethoxysilane
2-methacryloxyethyltrimethoxysilane
2-acryloxyethyltrimethoxysilane
3-methacryloxypropyltriethoxysilane
3-acryloxypropyltriethoxysilane
3-acryloxypropyldimethylethoxysilane
2-methacryloxyethyltriethoxysilane
2-acryloxyethyltriethoxysilane Such silanes are commercially available.

Other acrylates or methacrylates containing at least one functional group capable of reacting with the colloidal silica include 2-hydroxyethyl acrylate
2-hydroxyethyl methacrylate
2-hydroxypropyl acrylate
2-hydroxypropyl methacrylate
2-hydroxy-3-methacryloxy propyl acrylate
2-hydroxy-3-acryloxy propyl acrylate
2-hydroxy-3-methacryloxy propyl methacrylate tetrahydrofurfuryl methacrylate.

The third component (C) is a monomer which contains two or more functional groups selected from the group consisting of acryloxy and methacryloxy groups. These multifunctional monomers may be used individually or in blends. Examples of such monomers which may be utilized in the present invention are: diethylene glycol diacrylate, triethylene glycol diacrylate, tetraethylene glycol diacrylate, trimethylol propane triacrylate (TMPTA), 1,6 hexanediol diacrylate (HDDA), 1,4-butanediol diacrylate, ethylene glycol diacrylate, tripropylene glycol diacrylate, polyethylene glycol diacrylate, 1,4-butanediol dimethacrylate, poly (butanediol) diacrylate, tetraethylene glycol dimethacrylate, 1,3-butylene glycol diacrylate, triisopropylene glycol diacrylate, neopentyl glycol diacrylate, bisphenol A dimethacrylate, triacrylates of the formulas; trimethylolpropane trimethacrylate, pentaerythritol monohydroxy triacrylate, trimethylolpropane triethoxy triacrylate, tetracrylates; pentaerythiritol tetracrylate (PETA), di-trimethylolpropane tetracrylate, pentacrylates; dipentaerythritol (monohydroxy) pentacrylate.

Multifunctional acrylate monomers are commercially available from Aldrich Chemical Company, Inc. Milwaukee, Wis. Further examples of such acrylates are described in U.S. Pat. No. 4,973,612 and are incorporated herein by reference (see, e.g., col. 2, line 51-col. 3, line 10). Preferred examples of component (C) are HDDA and TMPTA and PETA, and most preferred, is a blend of HDDA and TMPTA.

The fourth component (D) is a free radical initiator. Examples of such free radical initiators triggered by radiant energy include without limitation benzoin ethers, benzoyl esters, alpha-acryloxime esters, acetophenone derivatives, benzil ketals and aminoketone derivatives. Specific examples of these photoinitiators include ethyl benzoin ether, isopropyl benzoin ether, methyl benzoyl formate, dimethoxyphenyl acetophenone, and diethoxyacetophenone. Also included are free radical initiators generated thermally (from peroxides, for example), and those derived by photoinitiation. Peroxide initiators for heat curing the present composition include any of the well-known peroxides for curing heat curable silicone or acrylic coatings such as 3,4 dichlorocumyl peroxide, benzoyl peroxide, etc. Preferred free radical initiators are those which are photoinitiators, and particularly preferred is methyl benzoyl formate.

The fifth component (E) is an organic tintability additive. As used herein, "organic tintability additive" refers to an additive which confers tintability to the cured hardcoat. The curing step for the hardcoat is described below. Significantly, the organic tintability additive of this invention is one that remains substantially unpolymerized, despite the curing step which cures the hardcoat resin matrix which is the remainder of the coating composition. As used herein, substantially unpolymerized means that no more than 10% of the organic tintability additive is polymerized. Preferably, less than 5% of the organic tintability additive is polymerized. It also is preferred that the organic tintability additive be a liquid at room temperature. Usually such a room temperature liquid is preferably a low molecular weight compound, more preferably a compound with a molecular weight of less than 2000 and still more preferably the molecular weight does not exceed about 800.

Preferred organic tintability additives for photoinitiated compositions are substantially transparent to ultraviolet radiation. By substantially transparent to ultraviolet radiation, it is meant that radiation of a wavelength between 250 and 350 nanometers is at least 90% transmitted, preferably at least 95% transmitted and more preferably at least 98% transmitted.

Non-limiting examples of organic tintability additives which can be used in this invention include compounds having at least one of the following functional groups: epoxide, ester, ketone or ether. A low molecular weight compound may have only one such functional group. Specific examples of these functional groups include epoxyesters and more particularly dicycloaliphatic epoxy esters and diesters; cyclohexene oxides; aliphatic diesters; cycloaliphatic esters; aliphatic monoglycidyl ethers; aliphatic monoglycidyl esters; cycloaliphatic ketones; allyloxy ethers; cycloaliphatic monoglycidyl ethers; diglycidyl ethers and divinyl ethers.

A preferred dicycloaliphatic epoxy ester additive is 3,4-epoxy cyclohexylmethyl-3,4-epoxycyclohexyl carboxylate (sold under the tradenames UVR 6110, ERL 4221, UVR6105 and UVR6100 by Union Carbide Corporation).

Polyhydroxy-functional compounds, butylated urea formaldehyde compounds and alkylated amine formaldehyde compounds can also be used as an organic tintability additive in this invention. Examples of such compounds are known in the art and disclosed in Guest et al. U.S. Pat. No. 5,013,608, col. 8, lines 44–62, and Guest et al. U.S. Pat. No. 5,102,695, col. 7, lines 37–57.

Preferred organic tintability additives are free of acrylic functionality. Particularly preferred organic tintability additives are free of vinyl functionality which is subject to polymerization by free radicals.

Although resorcinol monobenzoate has shown performance as a tintability additive, since it is not substantially transparent to ultraviolet radiation and, in fact, is known to be useful as an ultraviolet screen additive (see U.S. Pat. No. 4,455,205 to Olsen et al.), its incorporation into a photoinitiated coating lowers the hardness of the coating unacceptably or lengthens the cure time beyond economic viability. Thus, resorcinol is not a suitable organic tintability additive in a photoinitiated system. It is, however, a suitable organic tintability additive in a thermally cured peroxide-containing systems.

It should be noted that there is a limit to how volatile the organic tintability additive can be. That limit will vary with the manner in which the coating is applied, cured and used. Those skilled in the art will be able to determine which additives are so volatile for the specific application at hand that they do not lend sufficient tintability. Volatility is of more concern in thermal initiated systems than in photoinitiated systems. Excessive volatilization of the organic tintability additive in the thermal initiated cure system substantially adds to air emissions and material losses. Thus, in thermal initiated systems the boiling point of the additive should be at least 20° C. above the thermal cure temperature. Preferred organic tintability additives will have freezing points below 10° C. and more preferably below 0° C.

Other known additives to coatings may be included in the composition of the present invention, e.g. flow control additives, adhesion promoters, radical scavengers, cure accelerators, photoinitiator synergists, fillers and pigments where appropriate, etc. Solvents to improve coatability may also be employed, e.g. alcohols.

The ingredients (A), (B), (C), (D), and (E) can be mixed in any effective amounts to obtain the desired hardness and other properties. The following amounts are preferred:

|  | Preferred | More preferred | Most preferred |
| --- | --- | --- | --- |
| (1) component (A): (parts by weight) | 100 | 100 | 100 |
| (2) component (B): (parts by weight) | 5–500 | 10–200 | 20–100 |
| (3) component (C): (parts by weight) | 10–800 | 20–600 | 30–450 |
| (4) component (D): (% by weight of A & B & C) | 1–15 | 3–12 | 5–10 |
| (5) component (E): (% by weight of A & B & C) | 1–30 | 3–20 | 5–15 |

These parts by weight are not meant to limit the invention. Those skilled in the art will recognize that other parts by weight are possible without departing from the scope of this invention.

Although components A, B, C, D and E can all be mixed together at once, it is preferred to mix A, B and C together and remove solvent at reduced pressure or at atmospheric pressure and elevated temperatures. Reduced pressures range from 1 mm to 750 mm of Hg, preferably below 200 mm. Elevated temperatures preferably should not exceed 150° C., more preferably not above 120° C. Components D and E are added in any order or together. It is more preferable to mix A and B and remove solvent at reduced pressure or elevated temperature as described above. During this procedure a reaction between A and B takes place. Components C, D and E are then added in any order or together. As is known in the art, radical scavengers to prevent premature polymerization of the (meth)acrylate functional groups may be added initially. To pre-hydrolyze the silanes of B, water may also be added along with A and B as is known to the skilled artisan. A solvent may also be added as a compatibilizer or to aid in water removal or both.

In any event, whether A, B, C, D, and E are all added together, or A, B and C are premixed, A and B are reacted and D and E added later or A and B are premixed and reacted and C, D and E are added later, solvents and water need not be removed to make a useful composition.

The coating composition of the present invention is ordinarily coated on at least one surface of a substrate. The substrate may be comprised of a synthetic organic polymer, metal or glass. Also included as useful substrates are synthetic organic polymer substrates which themselves have a metallized surface. The coating compositions of this invention are especially useful as coatings for polycarbonates, such as poly (bisphenol-A carbonate) and those polycarbonates known as Lexan®, sold by General Electric Company, and as coatings for injection molded or extruded acrylics, such as polymethylmethacrylates. A further list of 2 0 other examples of substrates is included in Chung, U.S. Pat. No. 4,348,462, incorporated herein by reference (see, for example, col. 6, lines 19–45). Preferred substrates are substantially transparent. More preferred substrates are lenses. Especially preferred substrates are opthalmalic lenses Prior to the composition being coated upon a substrate there may optionally be included a priming step wherein a primer to enhance adhesion could first be applied to the substrate.

The coating compositions of the present invention can be applied to a variety of solid substrates by conventional methods, such as flowing, spraying or dipping, to form a continuous surface film.

After the coating composition is applied to the substrate or the primed substrate, the coating is cured thereon by an effective amount of energy, either radiation or heat. Actinic radiation, such as UV radiation, may be used. UV radiation, for example, may be obtained from a Hanovia 550 watt lamp or a PPG Processor, Model QC1202, Fusion lamps or other commercially available UV radiation sources. The type of lamp is not critical to the practice of the invention. Component (E), the organic tintability additive, remains substantially unpolymerized even after the resin matrix is cured. By choice of the proper formulation, application conditions and pretreatment of the substrate including the use of primers, the coatings can be adhered to substantially all solid substrates. The present coatings have shown excellent adhesion to polycarbonate substrates without a primer.

To form a tinted coating, the surface of the substrate coated with the cured resin matrix of the invention is contacted by a suitable colored dye, in many instances, any commercially viable method of applying the dye may be utilized. The leading manufacturer of suitable dyes is Brainpower, Inc. (BPI) and the usual procedure in tinting follows BPI instructions. In a typical tinting operation the surface of a substrate coated with a cured coating of the present invention is immersed in a heated dye bath containing a suitable colored dye, e.g., BPI Sun Brown or Black, a molecular catalytic dye sold by BPI of Miami, Fla. The dye solution is prepared by diluting one part of BPI dye concentration to ten parts water, and then heating the resulting solution to a temperature in the range of about 190° to 212° F. while constantly stirring the solution. The coated surface of the substrate is preferably cleaned by wiping with a compatible solvent prior to immersion in the dye bath at about 90–100° C. for a period of time sufficient to absorb or transmit the desired amount of dye, then washed with tap water to remove the excess dye and blown dry with nitrogen. The intensity of the tint can be adjusted by varying the concentration of the organic tintability additive in the coating composition or the thickness of the coating. The degree of tint obtained can be determined by using a calorimeter, such as a Gardner XL-835, which measures the percent of light transmittance.

A significant property of the coating composition of the present invention is that the desired amount of dye can be absorbed or transmitted to the substrate within a reasonable length of time. For example, in the ophthalmic industry two levels of light transmittance ("LT") are generally used in connection with the application of tints to lenses for eyeglasses. A 50% light transmittance means that the amount of dye absorbed or applied is sufficient to allow only 50% of the light to pass through the tinted lens. This is generally the level of light transmittance applicable to "fashion" tints for eyeglasses. A darker tint such as that used for sunglasses generally has a 20% light transmittance which means that the amount of dye absorbed allows only 20% of the light to pass through the lens. One particular type of plastic commonly used in the ophthalmic industry to make lenses, CR-39, generally will tint to 20% LT in approximately 15 minutes. Accordingly, it is desired that a 20% LT be achieved within 15–30 minutes under standard conditions. While the coating compositions of the present invention are able to achieve a 20% LT within this time period, they preferably achieve a 20% LT within from about 5 to about 15 minutes.

The coating compositions of the present invention are silica-based due to the condensation of colloidal silica and the various functional groups. Those skilled in the art will recognize that the relative weight percent of the colloidal silica can be varied in proportion with the remaining coating composition ingredients. The silica content can be adjusted by varying the relative amounts of the constituent components. This adjustment in silica content will, in turn, influence the physical properties of the hard coat. For example, the percent silica content is inversely related to the Δ% haze, which is a quantitative measure of haze on coated products according to the Taber Abrasion Resistance test, ASTM No. D 1044. That is to say, as the silica content becomes a greater percentage of the total solids in the hard coating, the value of Δ% haze will decrease for that particular hard coat. It will be recognized that such lower values of Δ % haze indicate improved abrasion resistance for those hard coats. Generally, coatings having acceptable abrasion resistance have a Δ $H_{300}$ (i.e., after 300 cycles) of less than about 15%.

TINTABILITY TEST

The percent light transmittance of the samples was determined using a Gardner Haze Meter Model 835 with a wavelength range of 600 nanometers. Lexan® ( polycarbonate from General Electric Company, Schenectady, N.Y., was used as a reference sample and substrate. The percent light transmittance of the uncoated polycarbonate is about 86.9%. The coating compositions were applied to the polycarbonate or other substrate and the percent light transmittance was determined as a direct reading from the meter. For tinted samples, the coated sample was immersed in the dye bath rinsed in cold tap water and blown dry with nitrogen.

ABRASION TEST (TABER TEST)

Abrasion resistance was determined according to ASTM Method D-1044. The instrument used was a Teledyne Taber model 503 Taber Abraser with two 250 gram auxiliary weights (500 gram load) for each of the CS10F abrasive wheels. The polycarbonate test panels were subjected to the specified cycles on the abraser turntable. The percent change in haze, which is the criterion for determining the abrasion resistance of a coating, was determined by measuring the difference in haze of the unabrased and abrased coatings. Haze is defined as the percentage of transmitted light which, in passing through the sample, deviates from the incident beam by forward scattering. In this method, only light flux that deviates more than 2.5 degrees on the average was considered to be haze. The percent haze on the coatings was determined by ASTM Method D1003. A Gardner Haze Meter Model 835 was used.

ADHESION TEST

Adhesion was measured by cross-hatch adhesion. A series of cross-hatch scribes were made in an area of one square inch with lines to form ⅕ inch squares. This surface was covered with 1.0 inch No. 670 Scotch Brand adhesive tape which was pressed down firmly over the cross-hatched area. The tape was withdrawn from the surface of the substrate with one rapid motion at about a 90° angle. This action of applying and removing the tape was carried out three times and then the substrate was observed. The number of squares remaining intact on the substrate was reported as a percentage of the total number of squares on the grid.

STEEL WOOL TEST

A one inch square of No. 0000 steel wool was applied over the face of a 2 pound weight and was secured with tape. Coated sample blanks were tested for scratch resistance to 11 double rubs across the center of the sample with the weighted steel wool. The weight was held such that the pressure on the steel wool came from the weight head. The sample was graded according to the amount of scratching produced by the steel wool and weight. The absence of scratches on the sample was graded excellent; one to two scratches was graded OK; several scratches was graded fair and ten or more scratches was graded poor.

The invention will be further illustrated by a consideration of the following examples. All parts and percentages in the examples are on a weight basis unless otherwise stated.

EXAMPLE 1

As a facile mode to compare the effectiveness of the various organic tintability additives in the composition of the present invention, it was convenient to prepare a master batch of acrylated silica to which the various additives were added. Although this procedure and the procedures for making other Masterbatches in subsequent examples, may not be the most preferred method for preparation of compositions of the present invention, for the limited purpose of characterizing a broad range of additives, it was most convenient to employ these procedures in the work that was done.

Masterbatch 1

121.7 parts of isopropyl alcohol (IPA), 86.9 parts of Component A, Nalcoag 1034A colloidal silica (from Nalco Corp.); and 0.07 parts of a radical scavenger, paramethoxy phenol (from Aldrich Chemical), were added to a suitable vessel with a reflux condenser. The blend was mixed for about 2 to 3 minutes and then 13.0 parts of Component B, methacryloxypropyltrimethoxysilane (MAPTMS), was added over a period of a 1–3 minutes. This hydrolysis mixture was heated to reflux (80° C.) in 5% oxygen and 95% nitrogen over a period of approximately 35 minutes, and was held at this temperature for 2 hours before cooling to about 25° C. Paramethoxy phenol was sometimes replaced by an effectively radical scavenging equal amount of 4-OH TEMPO (4-hydroxy-2, 2–6, 6-tetraethyl-1-piperidinyloxy) and the reaction was run under nitrogen. In both variants, the same hydrolyzate was prepared. No difference was found in the practice of this invention between hydrolyzates containing the two different radical scavengers which are not critical to the practice of this invention.

110.9 parts of hydrolyzate were transferred to a second vessel. If paramethoxy phenol was used as radical scavenger 0.015 parts of sodium acetate (from J. T. Baker) was added at this point. To the hydrolyzate was added 18.1 parts of component C, HDDA (SR238 from Sartomer Inc.), and 162.5 parts IPA. The contents of the vessel were stripped in a rotary evaporator at approximately 150 mm Hg at a temperature of 65 C. During the strip, air or nitrogen was bled to the bottom of the evaporator via a TEFLON® tube. The strip was continued about 30 minutes or until the overhead flow had ceased. At the end of the strip, the material was cooled to room temperature and was stored in brown glass or opaque 30 high density polyethylene containers (from Nalgene). The material hereafter is referred to as Masterbatch 1.

EXAMPLE 2

Masterbatch 2

In this example a second masterbatch containing Masterbatch 1, additional Component C, Component D and other additives was prepared.

To 100 parts of Masterbatch 1 in a suitable vessel was added, 50 parts of Component C, TMPTA,, 9 parts of Component D, methyl benzoylformate (Vicure 55 from AKZO), and 239 parts of IPA solvent. After mixing for about a minute a homogeneous solution was obtained. This is hereinafter referred to as Masterbatch 2.

EXAMPLES 3–39

In each of these examples, to 10 parts by weight of Masterbatch 2 was added the amount of organic tintability additive shown below in Table 1. The additive and Masterbatch 2 were mixed to a homogeneous solution, applied by flow coat to a 4 inch by 6 inch by 1/8 inch LEXAN® 9030 polycarbonate extruded and cut to size panels, allowed to stand for 2 minutes at ambient room temperature and cured by passing under 2 Fusion H lamps (300 watts per inch, each) with a focus 2.1 inches above a conveyer belt moving at 20 feet per minute for the number of passes shown in Table 1. Top of panel haze was determined visually and noted as the distance from the panel top in the 6 inch direction. Taber Δ haze was tested by the Abrasion Test procedure described above for the number of cycles shown below in Table 1. Tintability after dye bath immersion for 15 minutes was determined according to the Tintability Test procedure. Initial haze was measured on the bottom 2 inches of the panel according to the Abrasion Test for unabrased samples. The data in Table 1 were all generated at about the same time. Comparisons within these tabulations are generally consistent. However, comparison with data obtained at different times is not as consistent because of test equipment operating variability.

EXAMPLE 40

Masterbatch 40

The procedure of Example 2 was repeated except that 0.5 parts of a 25% solution of a silicone polyester in xylene (BYK 310 from BYK Chemie) was added to make Masterbatch 40.

EXAMPLE 41–62

The procedure of Examples 3–39 was repeated except that Masterbatch 40 replaced Masterbatch 2, the coatings were applied to 4 inches by 12 inches by 1/8 inch panels molded from LEXAN LS2-111 polycarbonate and one of each duplicate panel were cured at twice the number of passes. Table 2 gives the additive, additive level and results in the same format as Table 1.

EXAMPLE 63

Masterbatch 63

Masterbatch 63D

The procedure of Example 2 was repeated except that the level of isopropyl alcohol (IPA) was increased to 300 parts by weight and in some instances noted by the letter "D", was added Darocure 1173 (from Ciba-Geigy), 2-hydroxy-1-methyl-1-phenyl-1-propanone, in equal parts by weight, i.e., it was substituted for Vicure 55 used in Example 2. These Masterbatches are hereinafter referred to as Masterbatch 63 and Masterbatch 63D.

EXAMPLE 64–87

The procedure of Examples 3–39 was repeated except that in place of 10 parts by weight of Masterbatch 2, 11.5 parts by weight of either Masterbatch 63 or Masterbatch 63D as noted in the examples was substituted to provide an equal level of coating solids. The additives, the level of additives and the results of these tests are set forth in Table 3 in the same format as Tables 1 and 2.

EXAMPLE 88

Masterbatch 88

The procedure of Example 2 was repeated except that the level of IPA was changed to 279 parts by weight and instead of methyl benzoylformate photoinitiator 15.3 parts by weight of UVR 6110 organic tintability additive was incorporated into the masterbatch. This Masterbatch is hereinafter referred to as Masterbatch 88.

EXAMPLES 89–111

The procedure of Examples 3–39 was repeated with Masterbatch 88 replacing Masterbatch 2 and instead of adding to the Masterbatch the organic tintability additive (component E), a photoinitiator (Component D) of the type and in the amount set forth in Table 4 is added to Masterbatch 88.

EXAMPLE 112

Masterbatch 112

The procedure of Example 40 was repeated except that the level of Vicure 55 was increased to 11.5 parts by weight and the level of IPA was increased to 378 parts by weight. The resulting masterbatch is hereinafter referred to as Masterbatch 112.

EXAMPLES 113–182

In each of these examples, to 13.5 parts by weight of Masterbatch 112 was added the amount of organic tintability additive shown below in Table 5. The additive and Masterbatch 112 were mixed, cured on a polycarbonate substrate, tinted and tested as set forth in Examples 3–39. The results of these tests are set forth in Table 5. For Examples 113–138 and 167–182 the tint employed was BPI Black dye. For Examples 139–166 BPI Sun Brown dye was used. Since dye color has no effect on the haze of the coating or abrasion resistance, only the tintability test and a limited number of steel wool tests were conducted on specimens containing Sun Brown dye. Coating thicknesses ranged from 6.1 microns to 10.7 microns.

EXAMPLE 183

13.5 parts by weight of Masterbatch 112 and 0.29 parts by weight of UVR 6110 were mixed, coated on one side of an injection molded polymethylmethacrylate lens, let stand for 1 minute at room temperature, cured by one pass on a conveyer belt operating at 20 feet per minute under 2–300 Watt per inch Fusion H lamps focused at 2.1 inches above the conveyer and then repeated on the other side of lens with a coating thickness on each side of about 9.5 microns, tinted by immersion in a 90°–95° C. bath and tested for scribed adhesion, steel wool abrasion and tintability. Tintability after dye bath 15 minute immersion was 7.8% transmission. Steel wool abrasion was OK. Scribed adhesion failed because of no primer, inadequate solvent removal before cure and incomplete cure.

EXAMPLES 184–197

The coating composition of Example 183 was applied to one side of a 4 inch by 6 inch by 1/8 inch LEXAN 9030 polycarbonate extruded panels, let stand for two minutes at room temperature and cured as in Example 183 at the conveyer speed set forth in Table 6. The cured coated specimens were immersed in a 9% aqueous dye bath containing the dye set forth in Table 6.

TABLE 1

| Example | Organic Tintability Additive | Amount Parts by weight | Cure passes | Top of Panel Haze (inches) | Taber Δ haze 300 cycles % haze | Tintability after dye bath 15 minutes immersion % transmission | Initial haze % haze |
|---|---|---|---|---|---|---|---|
| 3 | A | 0.28 | 1 | 0 | 10.6 | 29.0 | 0.4 |
| 4 | B | 0.28 | 1 | 0 | 10.0 | 30.0 | 0.4 |
| 5 | C | 0.28 | 1 | 0 | 14.5 | 21.1 | 0.2 |
| 6 | D | 0.29 | 2 | 2 | 9.0 | 48.0 | 0.5 |
| 7 | E | 0.60 | 2 | 0 | 13.6 | 13.1* | 0.5 |
| 8 | F | 1.10 | 2 | 0 | 9.2 | 19.2 | 0.5 |
| 9 | G | 0.60 | 1 | 2.5 | 12.5 | 39.0 | 0.4 |
| 10 | H | 0.64 | 2 | 6 | 2.0 | 53.9 | 11.2 |
| 11 | I | 0.40 | 1 | 1 | 15.3 | 11.6 | 0.5 |
| 12 | J | 0.43 | 2 | 0 | 17.3 | 24.8 | 0.6 |
| 13 | K | 0.40 | 1 | 0 | 9.0 | 30.0 | 3.0 |
| 14 | L | 0.60 | 1 | 6 | 15.0 | 4.7 | 4.7 |
| 15 | M | 0.40 | 2 | 6 | 4.5 | 76.7 | 4.1 |
| 16 | N | — | 1 | 0 | 9.7 | 61.7 | 1.3 |
| 17 | A | 0.40 | 1 | 0.25 | 10.3 | 11.5 | 0.7 |
| 18 | O | 0.20 | 1 | 0.1 | 8.8 | 50.9 | 1.0 |
| 19 | P | 0.43 | 1 | 1 | 7.7 | 55.3 | 1.1 |
| 20 | I | 0.20 | 1 | 0.5 | 11.5 | 29.5** | 1.1 |
| 21 | Q | 0.40 | 3 | 1.5 | 4.0 | 47.9 | 1.9 |
| 22 | R | 0.40 | 3 | 0.1 | 8.5 | 42.3 | 0.8 |
| 23 | S | 0.40 | 4 | 0 | 9.7 | 21.5 | 1.0 |
| 24 | T | 0.40 | 2 | 0.5 | 15.3 | 38.1 | 0.6 |
| 25 | U | 0.40 | 2 | 0 | 24.3 | 29.7 | 0.9 |
| 26 | V | 0.40 | 2 | 0.5 | 21.5 | 55.0 | 0.7 |
| 27 | W | 0.40 | 2 | 0 | 11.2 | 47.6** | 0.8 |
| 28 | X | 0.40 | 1 | 6 | NT | 27.8 | 51.5 |
| 29 | Y | 0.40 | 4 | 2 | 7.1 | 60.4 | 0.9 |
| 30 | N | — | 1 | 0.1 | 8.3 | 60.0 | 1.1 |
| 31 | Z | 0.40 | 3 | 2 | 19.8 | 46.6*** | NT |
| 32 | AA | 0.40 | 2 | 0.5 | 11.6 | 56.2 | NT |
| 33 | BB | 0.40 | 3 | 0.5 | 17.6 | 45.0 | NT |
| 34 | CC | 0.40 | 2 | 0 | 12.5 | 74.1*** | NT |
| 35 | A | 0.40 | 2 | 0 | 7.6 | 26.3 | NT |
| 36 | C | 0.40 | 2 | 1 | 9.3 | 17.2 | NT |
| 37 | DD | 0.40 | 2 | 0.5 | 7.0 | 29.5 | NT |
| 38 | F | 0.60 | 2 | 0.5 | 5.4 | 34.8* | NT |
| 39 | B | 0.40 | 2 | 0.1 | 8.0 | 28.6 | NT |
| 39A | NN | 0.40 | 3 | 0.1 | 10.0 | 51.0 | NT |
| 39B | OO | 0.40 | 2 | 0.1 | >20 | 24.8 | NT |
| 39C | PP | 0.40 | 1 | 3 | 6.4 | 20.1 | NT |
| 39D | A | 0.40 | 2 | 0.1 | 8.5 | 35.6 | NT |
| 39E | N | 0.40 | 2 | 1 | 6.6 | NT | NT |

*Heavy cracking observed
**Shift to slight green tint
***Bath temperature 80–85° C.
— No amount
NT — Not Tested
The Organic Tintability Additives are listed in Table 1A

TABLE 1A

| Organic Tintability Additive | Commercial Designation | Chemical Name |
|---|---|---|
| A | UVR 6110 (ERL 4221) | 3,4-epoxycyclohexylmethyl-3,4-epoxycyclohexylcarboxylate |
| B | ERL 4299 | Bis-(3,4-epoxycyclohexyl-methyl)adipate |
| C | Haloxy 7 | Alkyl-(C$_{8-10}$) glycidylether |
| D | — | Diethylsuberate |
| E | Cardura E-10 | Glycidylneodecanoate |
| F | — | Butyl lactate |
| G | Cyclomer A200 | (3,4-epoxycyclohexylmethyl) acrylate |
| H | — | Glycidylmethacrylate |
| I | Celloxide 3000 | 1,2:8,9 diepoxylimonene |
| J | — | Dibutylmaleate |
| K | — | Vinylcyclohexene oxide |
| L | Heloxy 63 | Phenylglycidyl ether |
| M | — | Dimethyl maleate |
| N | — | No additive added |
| O | ERL 4234 | Dicycloaliphatic epoxide diether |
| P | — | Cyclohexane oxide |
| Q | Rapi-Cure DVE 3 | 3,4,9,12-tetraoxatetradeca-1,13-diene |
| R | Rapi-Cure HBVE | 4-ethenyloxy-1-butanol |
| S | Rapi-Cure PEPC | 4-propenyloxymethyl-1,3,2-dioxolanone |
| T | — | Tetraalkyloxyethane |
| U | Rapi-Cure CHMVE | 1,4-cyclohexanedimethanol |
| V | Vectomer 4020 | Bis-(4-vinyloxymethylcyclo-hexylmethyl) glutarate |

TABLE 1A-continued

| Organic Tintability Additive | Commercial Designation | Chemical Name |
|---|---|---|
| W | Sipomer GAE | Glycerylalkylether |
| X | — | 1,4-butanediol |
| Y | Rapi-Cure CHVE | 1,4-bis(vinyloxy) methylcyclohexane |
| Z | Uralac 3004-109 | Vinylether maleate |
| AA | Uralac 3004-100 | Vinylether maleate |
| BB | Uralac 3004-102 | Vinylether maleate |
| CC | Uraiac 3004-101 | Vinylether maieate |
| DD | Heloxy 107 | Diglycidyl ether of cyclohexanedimethanol |
| EE | LRCE 1001 | Glycidylneodecanoate |
| FF | Acticryl CL960 | N-(2 acryloxyethyl)-1-methylethyl carbamate |
| GG | Acticryl CL1042 | 2-acryloxyethyl-2-oxo-1,3-dioxanyl-4-methyl carbonate |
| HH | — | Methacryloxypropyltrimethoxy silane |

TABLE 1A-continued

| Organic Tintability Additive | Commercial Designation | Chemical Name |
|---|---|---|
| II | Heloxy 116 | 2-ethylhexyl glycidylether |
| JJ | Heloxy 61 | Butylglycidyl ether |
| KK | Glydex N-10 | Glycidyl ester |
| LL | — | Mono-2-ethylhexyl maleate |
| MM | — | Bis-(methoxymethylethyl) maleate |
| NN | — | Bis-(2-ethylhexyl) sebacate |
| OO | — | Resorcinol monobenzoate |
| PP | — | Diethyl malonate |
| QQ | — | 2-Cyclohexylethyl acetate |
| RR | — | Salicylaldehyde |
| SS | — | Butyl acetate |
| TT | — | Diacetone alcohol |
| UU | Epirez 5044 | Triglycidylether |
| No entry | | |

TABLE 2

| Example | Organic Tintability Additive | Amount Parts by weight | Cure passes | Top of Panel Haze (inches) | Taber Δ haze 300 cycles % haze | Tintability after dye bath 15 minutes immersion % transmission | Steel Wool Test |
|---|---|---|---|---|---|---|---|
| 41 | O | 0.55 | 1 | 2 | 6.2 | 25.0 | OK |
| 42 | O | 0.55 | 2 | NT | 5.4 | 44.5 | EXC |
| 43 | B | 0.42 | 1 | 3 | 5.0 | 15.5 | POOR |
| 44 | B | 0.42 | 2 | NT | 4.5 | 33.0 | EXC |
| 45 | A | 0.42 | 1 | 3 | 6.0 | 15.1 | FAIR |
| 46 | A | 0.42 | 2 | NT | 4.9 | 33.7 | EXC |
| 47 | I | 0.30 | 1 | 6 | 5.0 | 17.5 | FAIR |
| 48 | I | 0.30 | 2 | NT | 2.1 | 55.1 | EXC |
| 49 | S | 0.40 | 3 | 2 | 2.7 | 29.2 | FAIR |
| 50 | S | 0.40 | 6 | NT | 2.9 | 43.2 | EXC |
| 51 | K | 0.41 | 1 | 12 | NT | NT | NT |
| 52 | K | 0.41 | 2 | NT | NT | NT | NT |
| 53 | E | 0.50 | 1 | 6 | 12.4 | 4.1* | OK |
| 54 | E | 0.50 | 2 | NT | 3.2 | 16.0* | OK |
| 55 | EE | 0.50 | 1 | 4 | 11.8 | 5.6* | VERY POOR |
| 56 | D | 0.30 | 1 | 8 | 7.9 | 10.7 | POOR |
| 57 | C | 0.42 | 1 | 8 | 6.7 | 9.8 | POOR |
| 58 | DD | 0.41 | 1 | 3 | 4.6 | 24.4 | OK |
| 59 | DD | 0.41 | 2 | NT | 4.3 | 40.9 | OK |
| 60 | N | — | 1 | 5 | 5.0 | 57.3 | FAIR |
| 61** | K | 0.39 | 1 | 4 | 5.9 | 22.4 | FAIR |
| 62*** | — | — | — | NT | 52.3 | 71.7 | NT |

*Cracks upon tinting
**Coated on panel extruded from LEXAN 9030 polycarbonate
***Uncoated injection molded panel from LEXAN LS2-111 polycarbonate
NT — Not tested
— No amount
The Organic Tintability Additives are listed in Table 1A

TABLE 3

| Example | Masterbatch | Organic Tintability Additive | Amount Parts by weight | Cure passes | Top of Panel Haze (inches) | Taber Δ haze 300 cycles % | Tintability after dye bath 15 minutes immersion % | Initial haze % |
|---|---|---|---|---|---|---|---|---|
| 64* | 63D | E | 0.42 | 1 | N.T. | 17.9 | 19.1 | 0.9 |
| 65* | 63D | L | 0.42 | 1 | N.T. | 4.3 | 28.5 | 6.4 |
| 66* | 63D | FF | 0.42 | 1 | N.T. | 8.8 | 53.4 | 0.5 |
| 67* | 63D | GG | 0.42 | 1 | N.T. | 7.5 | 59.3 | 0.4 |
| 68 | 63D | G | 0.42 | 1 | N.T. | 2.9 | 65.5 | 5.2 |

TABLE 3-continued

| Example | Master-batch | Organic Tintability Additive | Amount Parts by weight | Cure passes | Top of Panel Haze (inches) | Taber Δ haze 300 cycles % | Tintability after dye bath 15 minutes immersion % | Initial haze % |
|---|---|---|---|---|---|---|---|---|
| 69* | 63D | H | 0.42 | 1 | N.T. | 0.3 | 59.0 | 8.1 |
| 70* | 63D | C | 0.42 | 2 | N.T. | 10.2 | 31.7 | 2.6 |
| 71* | 63D | A | 0.42 | 1 | N.T. | 11.9 | 30.7 | 1.1 |
| 72* | 63D | F | 0.42 | 1 | N.T. | 11.0 | 23.1 | 1.6 |
| 73 | 63D | N | — | 1 | N.T. | N.T. | 57.5 | N.T. |
| 74 | 63D | D | 0.42 | 3 | N.T. | N.T | 24.4 | N.T. |
| 75 | 63D | HH | 0.42 | 1 | N.T. | N.T. | 51.3 | N.T. |
| 76* | 63 | E | 0.40 | 2 | 4 | 5.7 | 23.1 | 1.2 |
| 77* | 63 | C | 0.40 | 2 | 6 | 7.5 | 11.7 | 2.0 |
| 78* | 63 | A | 0.40 | 1 | 1 | 8.5 | 7.8 | 1.6 |
| 79* | 63 | F | 0.40 | 2 | 4 | 4.4 | 48.5 | 1.7 |
| 80* | 63 | D | 0.45 | 2 | 8 | 9.5 | 5.9 | 2.2 |
| 81* | 63 | II | 0.40 | 2 | 8 | 5.4 | 24.1 | 2.6 |
| 82* | 63 | JJ | 0.40 | 1 | 10 | 5.3 | 17.6 | 2.5 |
| 83* | 63 | KK | 0.40 | 2 | 5 | 6.4 | 24.9 | 2.1 |
| 84* | 63 | LL | 0.40 | 2 | 1.5 | 17.6 | 23.1 | 1.4 |
| 85* | 63 | MM | 0.40 | 1 | 1 | 7.7 | 9.5 | 1.1 |
| 86 | 63D | N | — | 1 | 0.5 | 6.7 | N.T. | N.T. |
| 87 | 63 | N | — | 1 | 1 | 6.6 | N.T. | N.T. |

*Coatings applied on 4 inch by 12 inch by ⅛ inch panels molded from LEXAN LS2-111 polycarbonate
N.T. — Not tested
— — No amount
The Organic Tintability Additives are listed in Table 1A

TABLE 4

| Example | Photo-initiator | Amount Parts by weight | Cure passes | Top of Panel Haze (inches) | Taber Δ haze 300 cycles % | Steel Wool Test | Tintability after dye bath 15 minutes immersion % | Initial haze % |
|---|---|---|---|---|---|---|---|---|
| 89* | a | 0.24 | 1 | 0 | 11.7 | FAIR | 43.5 | 0.9 |
| 90* | b | 0.24 | 1 | 0 | 12.3 | EXC | 49.9 | 0.9 |
| 91* | c | 0.23 | 1 | 0 | 12.1 | EXC | 50.8 | 1.1 |
| 92* | d | 0.25 | 1 | 0 | 10.6 | EXC | 53.6 | 0.6 |
| 93* | e | 0.25 | 1 | 0.5 | 9.2 | EXC | 28.9 | 1.1 |
| 94* | f | 0.25 | 1 | 0 | 8.8 | FAIR | 47.3 | 0.8 |
| 95* | g | 0.25 | 1 | 0 | 12.7 | EXC | 34.7 | 0.7 |
| 96* | h | 0.23 | 2 | 0 | 8.7 | N.T. | 63.1 | 1.0 |
| 97* | i | 0.22 | 1 | 0 | 12.0 | EXC | 64.5 | 1.1 |
| 98 | j | 0.22 | 1 | 0 | 14.4 | EXC | 13.9 | 0.6 |
| 99 | k | 0.26 | 1 | 0 | 12.6 | FAIR | 52.5 | 0.6 |
| 100 | h | 0.25 | 1 | 0 | 9.7 | EXC | 62.4 | 0.8 |
| 101 | a | 0.12 | 2 | 0 | 3.2 | POOR | 53.4 | N.T. |
| 102 | b | 0.14 | 2 | 0 | 3.5 | N.T. | 56.5 | N.T. |
| 103 | c | 0.10 | 2 | 0 | 5.9 | N.T. | 57.3 | N.T. |
| 104 | d | 0.14 | 1 | 0 | 4.1 | OK | 55.4 | N.T. |
| 105 | e | 0.12 | 2 | 0.3 | 8.4 | POOR | 49.2 | N.T. |
| 106 | f | 0.12 | 4 | 0 | 7.8 | POOR | 54.8 | N.T. |
| 107 | g | 0.14 | 2 | 0 | 9.1 | FAIR | 54.8 | N.T. |
| 108 | h | 0.13 | 2 | 0 | 6.7 | FAIR | 61.8 | N.T. |
| 109 | k | 0.15 | 2 | 0 | 4.6 | POOR | 55.4 | N.T. |
| 110 | j | 0.13 | 2 | 0 | 6.5 | POOR | 50.8 | N.T. |
| 111 | e | 0.25 | 1 | 0.3 | 5.5 | FAIR | 31.8 | N.T. |

*Panel 3/16 inch thick instead of ⅛"
N.T. — Not tested
The Photoinitiators are listed in Table 4A

TABLE 4A

| Photoinitiator | Commercial Designation | Chemical Name |
|---|---|---|
| a | Darocure 1173 | Previously defined |
| b | Irgacure 184 | 1-Hydroxycyclohexyl phenyl ketone |
| c | Irgacure 184 | 2-hydroxy-1-[4-(2-hydroxyethoxy)phenyl]-2-methyl-1-propanone |

TABLE 4A-continued

| Photoinitiator | Commercial Designation | Chemical Name |
|---|---|---|
| d | CGI 1700 | 25/75 blend of bis(2,6-dimethoxybenzoyl)-2,4,4-trimethylpentylphosphine oxide and 2-hydroxy-2-methyl-1-phenylpropanone |
| e | Vicure 55 | Previously defined |
| f | Irgacure 651 | 2,2-Dimethoxy-2-phenyl acetophenone |
| g | Irgacure 500 | Blend of benzophenone and Irgacure 184 |
| h | Irgacure 907 | 2-methyl-1-[4-(methylthio)phenyl]-2-morpholinopropanone-1 |
| i | Irgacure 369 | 2-benzyl-2-N,N-dimethylamino-1-(4-morpholinophenyl)-1-butanone |
| j | BMS Quantacure | 4-benzoyl-4-methyldiphenyl sulfide |
| k | Durocure 4265 | 50/50 blend of 2-hydroxy-2-methyl-1-phenyl propane-1-one and 2,4,6-trimethyl benzoyldiphenylphosphine oxide |

TABLE 5

| Example | Organic Tintability Additive | Amount Parts by weight | Cure passes | Top of Panel Haze (inches) | Taber Δ haze 500 cycles % haze | Tintability after dye bath 15 minutes immersion % transmission | Initial haze % haze | Steel Wool Test |
|---|---|---|---|---|---|---|---|---|
| 113 | F | 0.64 | 1 | 0.5 | 12.0 | 31.2*** | 0.5 | Exc |
| 114 | D | 0.60 | 1 | 2 | 23.6 | 5.1 | 0.6 | V poor |
| 115 | N | — | 1 | 1 | 8.0 | 72.8 | 0.4 | Exc |
| 116 | J | 0.61 | 1 | 2 | 29.5 | 6.6 | 0.5 | V Poor |
| 117 | QQ | 0.61 | 1 | 3 | 11.5 | 13.7 | 0.9 | exc |
| 118 | PP | 0.61 | 1 | 5 | NT | 36.3*** | NT | NT |
| 119 | AA | 0.61 | 1 | 0 | 28.7 | 36.4 | 0.5 | V Poor |
| 120 | CC | 0.61 | 1 | 0.3 | 19.9 | 44.1***** | 0.3 | Poor |
| 121 | Q | 0.61 | 1 | 3 | NT** | — | — | NT |
| 122 | R | 0.61 | 1 | 1 | NT** | — | — | NT |
| 123 | S | 0.61 | 1 | 0 | NT** | — | — | NT |
| 124 | T | 0.61 | 1 | 0.5 | NT** | — | — | NT |
| 125 | Y | 0.61 | 1 | 1.5 | NT** | — | — | NT |
| 126 | W | 0.62 | 1 | 0 | 28.9 | 7.4 | 0.4 | Poor |
| 127 | U | 0.61 | 1 | 0 | NT** | NT | — | NT |
| 128 | SS | 0.61 | 1 | 2 | 7.5 | 72.1 | 0.5 | Exc |
| 129 | RR | 0.61 | 1 | 5 | NT** | NT | NT | NT |
| 130 | D | 0.31 | 1 | 2 | 13.5 | 18.5* | 0.6 | Fair |
| 131 | J | 0.31 | 1 | 3 | 12.2 | 17.0* | 0.2 | Poor |
| 132 | Q | 0.31 | 1 | 4 | NT** | — | — | NT |
| 133 | R | 0.30 | 1 | 2 | NT** | NT | NT | NT |
| 134 | N | — | 1 | 3 | 7.7 | 73.5 | 0.6 | Exc |
| 135 | S | 0.32 | 1 | 0.5 | NT** | NT | NT | NT |
| 136 | T | 0.30 | 1 | 2 | 24.0 | 23.1 | 0.6 | V Poor |
| 137 | W | 0.31 | 1 | 0 | 14.4 | 34.3 | 0.5 | Exc |
| 138 | RR | 0.31 | 1 | 6 | 13.1 | 34.1 | 2.2 | Exc |
| 139 | F | 0.64 | 1 | NT | NT | 26.9 | 2.2 | Exc |
| 140 | D | 0.60 | 1 | NT | NT | 5.6 | 2.2 | Exc |
| 141 | N | — | 1 | NT | NT | 72.2 | 2.2 | Exc |
| 142 | J | 0.61 | 1 | NT | NT | 4.3 | 2.2 | Exc |
| 143 | QQ | 0.61 | 1 | NT | NT | 12.1 | 2.2 | Exc |
| 144 | PP | 0.61 | 1 | NT | NT | 18.3 | 2.2 | Exc |
| 145 | AA | 0.61 | 1 | NT | NT | 28.1 | 2.2 | Exc |
| 146 | CC | 0.61 | 1 | NT | NT | 40.0 | 2.2 | Exc |
| 147 | D | 0.31 | 1 | NT | NT | 21.4 | 2.2 | Fair |
| 148 | J | 0.31 | 1 | NT | NT | 20.6 | 2.2 | poor |
| 149 | N | — | 1 | NT | NT | 73.8 | 2.2 | Exc |
| 150 | T | 0.30 | 1 | NT | NT | 25.7 | NT | V Poor |
| 151 | W | 0.31 | 1 | NT | NT | 35.8 | NT | Exc |
| 152 | RR | 0.31 | 1 | NT | NT | 39.8 | NT | Exc |
| 153 | U | 0.32 | 1 | NT | NT | 15.8 | NT | V POQr |
| 154 | TT | 0.31 | 1 | NT | NT | 66.6 | NT | Exc |
| 155 | C | 0.31 | 1 | NT | NT | 31.5 | NT | Exc |
| 156 | SS | 1.2 | 1 | NT | NT | 74.9 | NT | Exc |
| 157 | TT | 1.2 | 1 | NT | NT | 27.9◊ | NT | Exc |
| 158 | J | 0.15 | 1 | NT | NT | 45.0 | NT | Exc |
| 159 | D | 0.15 | 1 | NT | NT | 39.3 | NT | Exc |
| 160 | QQ | 0.15 | 1 | NT | NT | 51.6 | NT | Exc |
| 161 | Q | 0.15 | 1 | NT | NT | 18.4 | NT | Exc |

TABLE 5-continued

| Example | Organic Tintability Additive | Amount Parts by weight | Cure passes | Top of Panel Haze (inches) | Taber Δ haze 500 cycles % haze | Tintability after dye bath 15 minutes immersion % transmission | Initial haze % haze | Steel Wool Test |
|---|---|---|---|---|---|---|---|---|
| 162 | R | 0.15 | 1 | NT | NT | 30.6 | NT | Exc |
| 163 | N | — | 1 | NT | NT | 70.7 | NT | Exc |
| 164 | S | 0.15 | 1 | NT | NT | 31.3 | NT | Exc |
| 165 | T | 0.15 | 1 | NT | NT | 47.6 | NT | Exc |
| 166 | U | 0.15 | 1 | NT | NT | 44.2 | NT | Exc |
| 167 | U | 0.32 | 1 | 0.5 | 25.0 | 19.9 | 0.2 | V Poor |
| 168 | TT | 0.31 | 1 | 2 | 9.9 | 65.2 | 0.3 | Exc |
| 169 | C | 0.31 | 1 | 2 | 15.3 | 26.6* | 0.6 | OK |
| 170 | Y | 0.31 | 1 | 1.5 | NT** | NT | NT | NT |
| 171 | SS | 1.2 | 1 | 5 | 8.1 | 73.1 | 1.1 | Exc |
| 172 | TT | 1.2 | 1 | 1 | 11.5 | 31.6◊ | 0.4 | Exc |
| 173 | J | 0.15 | 1 | 0.3 | 12.6 | 43.5**** | 0.8 | Exc |
| 174 | D | 0.15 | 1 | 1 | 12.8 | 33.9*** | 0.4 | Exc |
| 175 | QQ | 0.15 | 1 | 1 | 11.9 | 52.9**** | 0.3 | Exc |
| 176 | Q | 0.15 | 1 | 0.5 | NT | 22.3 | NT | V Poor |
| 177 | R | 0.15 | 1 | 0.5 | 16.8 | 35.1 | 1.0 | Poor |
| 178 | N | — | 1 | 0.5 | 9.4 | 68.7 | 1.0 | Exc |
| 179 | S | 0.15 | 1 | 0 | 25.9 | 34.4 | 1.0 | Poor |
| 180 | T | 0.15 | 1 | 0.5 | 15.8 | 50.9 | 0.2 | Fair |
| 181 | U | 0.15 | 1 | 0.1 | 22.5 | 45.7 | 0.8 | Poor |
| 182 | Y | 0.15 | 1 | 0.3 | NT** | NT | NT | NT |

*Slight brown tint
**Smeared to touch
***Green color shift
****Yellow color shift
*****Blotchey tint
◊ Partial deamination in tint bath
NT — Not tested
— No amount
The Organic Tintability Additives are listed in Table 1A

TABLE 6

| Example | Conveyer Speed Feet per Minute | Initial haze % haze | Taber Δ haze 500 cycles % haze | Coating Thickness | Initial Transmission % Transmission | Tintability after dye bath 15 minutes immersion % transmission |
|---|---|---|---|---|---|---|
| 184 | 35 | 0.6 | 14.3 | | | |
| Black | | | | 5.4 | 87.3 | 14.7 |
| Brown | | | | 5.4 | 87.5 | 15.5 |
| 185 | 35 | 0.6 | 14.3 | | | |
| Black | | | | 6.5 | 87.3 | 12.6 |
| Brown | | | | 6.2 | 87.4 | 17.4 |
| 186 | 30 | 0.4 | 12.9 | | | |
| Black | | | | 4.7 | 87.6 | 19.0 |
| Brown | | | | 4.7 | 87.5 | 19.9 |
| 187 | 30 | 0.4 | 12.9 | | | |
| Black | | | | 5.7 | 87.5 | 15.5 |
| Brown | | | | 6.1 | 87.5 | 20.2 |
| 188 | 25 | 0.6 | 12.3 | | | |
| Black | | | | 5.1 | 87.6 | 21.3 |
| Brown | | | | 4.9 | 87.5 | 22.2 |
| 189 | 25 | 0.6 | 12.3 | | | |
| Black | | | | 5.8 | 87.6 | 19.4 |
| Brown | | | | 5.8 | 87.6 | 25.5 |
| 190 | 20 | 0.5 | 11.3 | | | |
| Black | | | | 4.4 | 87.3 | 25.8 |
| Brown | | | | 4.5 | 87.2 | 26.4 |
| 191 | 20 | 0.5 | 11.3 | | | |
| Black | | | | 5.5 | 87.4 | 32.1 |
| Brown | | | | 5.6 | 87.4 | 34.5 |
| 192 | 15 | 0.4 | 10.9 | | | |
| Black | | | | 4.8 | 87.4 | 33.8 |
| Brown | | | | 5.0 | 87.5 | 30.3 |
| 193 | 15 | 0.4 | 10.9 | | | |
| Black | | | | 5.7 | 87.6 | 40.3 |
| Brown | | | | 6.0 | 87.5 | 42.6 |
| 194 | 10 | 0.4 | 9.7 | | | |

TABLE 6-continued

| Example | Conveyer Speed Feet per Minute | Initial haze % haze | Taber Δ haze 500 cycles % haze | Coating Thickness | Initial Transmission % Transmission | Tintability after dye bath 15 minutes immersion % transmission |
|---|---|---|---|---|---|---|
| Black |  |  |  | 4.8 | 87.5 | 45.7 |
| Brown |  |  |  | 4.9 | 87.3 | 42.5 |
| 195 | 10 | 0.4 | 9.7 |  |  |  |
| Black |  |  |  | 5.2 | 87.6 | 53.6 |
| Brown |  |  |  | 5.6 | 87.3 | 53.9 |
| 196 | 5 | 0.7 | 8.7 |  |  |  |
| Black |  |  |  | 4.9 | 87.4 | 58.2 |
| Brown |  |  |  | 4.9 | 87.3 | 54.0 |
| 197 | 5 | 0.7 | 8.7 |  |  |  |
| Black |  |  |  | 5.9 | 87.5 | 62.3 |
| Brown |  |  |  | 6.0 | 87.4 | 61.5 |

Initial transmission measured transmission of one side coated panel after cure but before tint.

EXAMPLE 198

The formulation of Examples 183 was prepared, mixed, and coated on panels and cured as set forth in Examples 184–197 at varying conveyer speeds which varied exposure time to radiant energy; the faster the conveyer speed the less radiant energy exposure of the coatings. The experiment was repeated with two times the level of UVR6110 (0.58 parts by weight) and again repeated at three times the level of UVR6110 (0.87 parts by weight). In the replications sufficient IPA was added to maintain the percent solids level constant.

| Organic Tintability Additive Parts by weight | Conveyer Speed Feet per Minute | Tintability after dye bath 15 minutes immersion % transmission | Taber Δ haze 500 cycles % haze |
|---|---|---|---|
| 0.29 | 10 | 36.6 | 15.5 |
| 0.29 | 20 | 20.3 | 15.4 |
| 0.29 | 30 | 9.7 | 24.4 |
| 0.58 | 5 | 20.3 | 19.8 |
| 0.58 | 10 | 9.1 | 27.0 |
| 0.58 | 15 | 6.0 | 31.2 |
| 0.58 | 20 | 3.8 | 33.9 |
| 0.58 | 25 | 4.1 | 34.5 |
| 0.58 | 30 | 4.6 | 34.8 |
| 0.58 | 35 | 4.8 | 32.4 |
| 0.87 | 5 | 6.3 | 27.3 |
| 0.87 | 10 | 3.7 | 31.2 |
| 0.87 | 15 | 2.3 | 38.6 |
| 0.87 | 20 | 2.6 | 41.8 |
| 0.87 | 25 | 2.5 | 43.8 |
| 0.87 | 30 | 2.2 | 43.9 |
| 0.87 | 35 | 2.4 | 42.3 |

Figure 2:
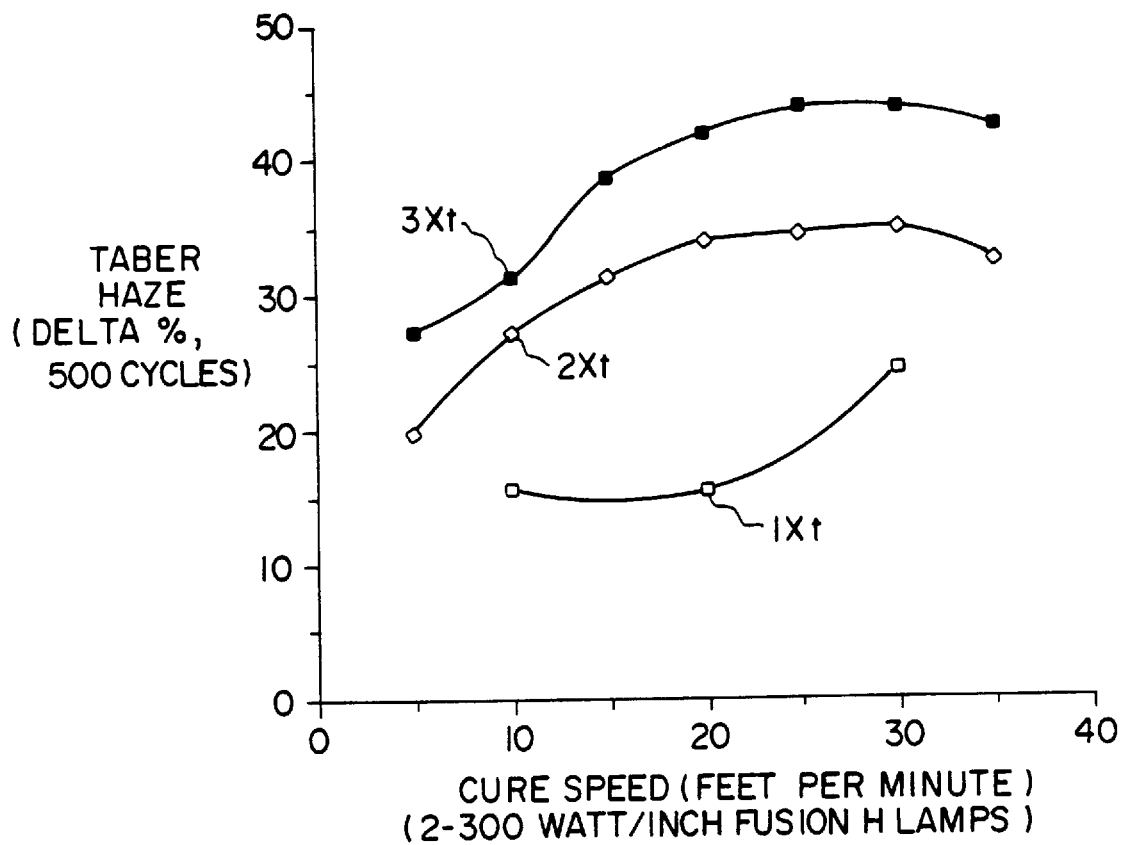
FIG. 2 is a graphical representation of the Taber haze data of Example 198.

The tintability data are plotted in FIG. 1. The Taber Δ haze data are ted in FIG. 2.

EXAMPLE 199

A formulation as follows was mixed together at room temperature in air;

|  | Parts by weight |
|---|---|
| Masterbatch 1 | 100 |
| TMPTA | 50 |
| Vicure 55 | 11.5 |

-continued

|  | Parts by weight |
|---|---|
| UVR 6110 | 11.5 |
| BYK 310 | 0.5 |

To this mixture IPA was added in an amount necessary to give a formulation with the % by weight of solids set forth below in the table. Each formulation was applied to a LEXAN 9030 polycarbonate extruded panel, 4 inches by 6 inches by ⅛ inches, and cured as set forth in Example 183 at the conveyer speeds set forth in the table.

| % Solids | Cure Speed (feet per minute) | Coating Thickness (microns) | Tintability after dye bath 15 minutes immersion % transmission | Taber Δ haze 500 cycles % haze | Steel Wool Test |
|---|---|---|---|---|---|
| 40 | 30 | 8.5 | 13.4 | 18.8 | OK |
| 40 | 20 | 9.0 | 21.4 | 19.9 | OK |
| 40 | 10 | 9.5 | 33.6 | 18.2 | OK |
| 40 | 5 | 9.3 | 51.4 | 15.2 | Exc |
| 30 | 30 | 6.5 | 14.0 | 21.4 | Fair |
| 30 | 20 | 5.5 | 19.3 | 20.6 | OK |
| 30 | 10 | 6.5 | 27.9 | 17.4 | OK |
| 30 | 5 | 6.0 | 49.2 | 14.7 | Exc |
| 20 | 30 | 4.2 | 18.0 | 17.6 | Fair |
| 20 | 20 | 4.0 | 22.9 | 17.7 | OK |
| 20 | 10 | 4.2 | 36.7 | 15.1 | Exc |
| 20 | 5 | 4.3 | 52.7 | 12.2 | Exc |
| 10 | 30 | 2.2 | 32.3 | 27.0 | Poor |
| 10 | 20 | 1.6 | 37.1 | 20.5 | Fair |
| 10 | 10 | 2.0 | 42.0 | 16.8 | Fair |
| 10 | 5 | 1.8 | 51.9 | 14.6 | Fair |

Figure 3:
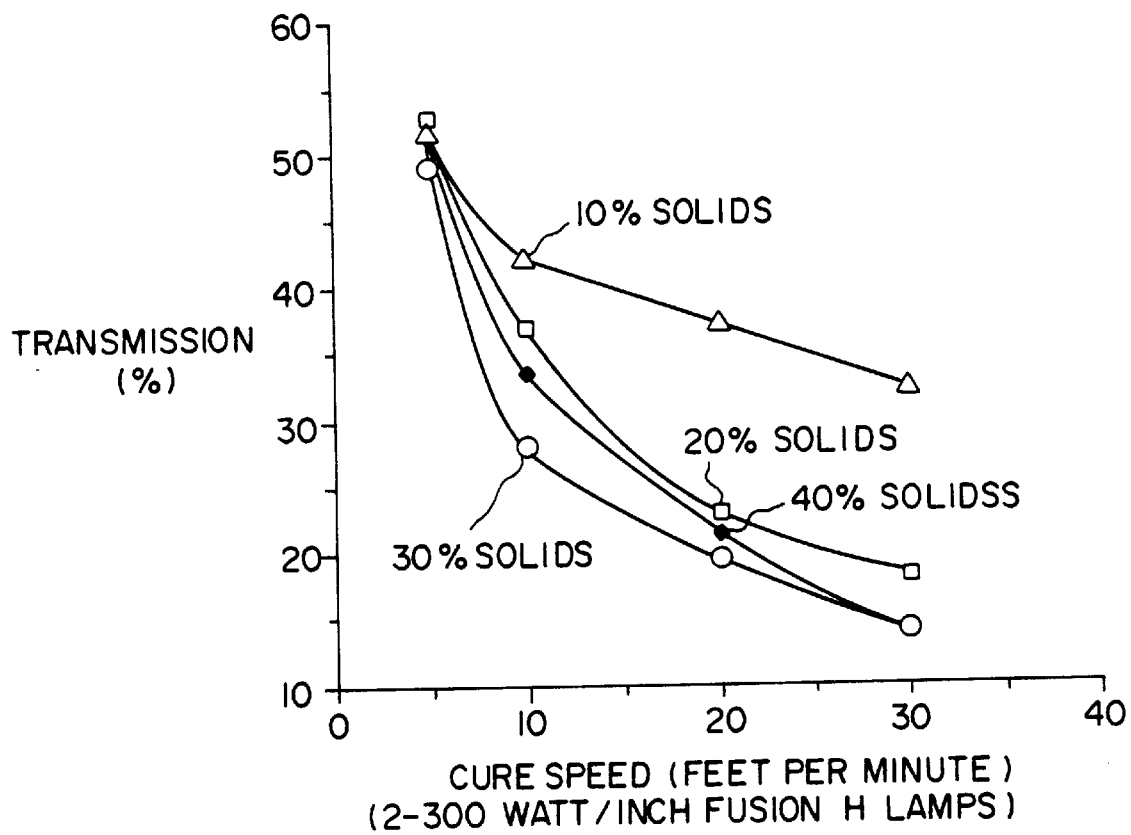
FIG. 3 is a graphical representation of the tintability data of Example 199.
Figure 4:
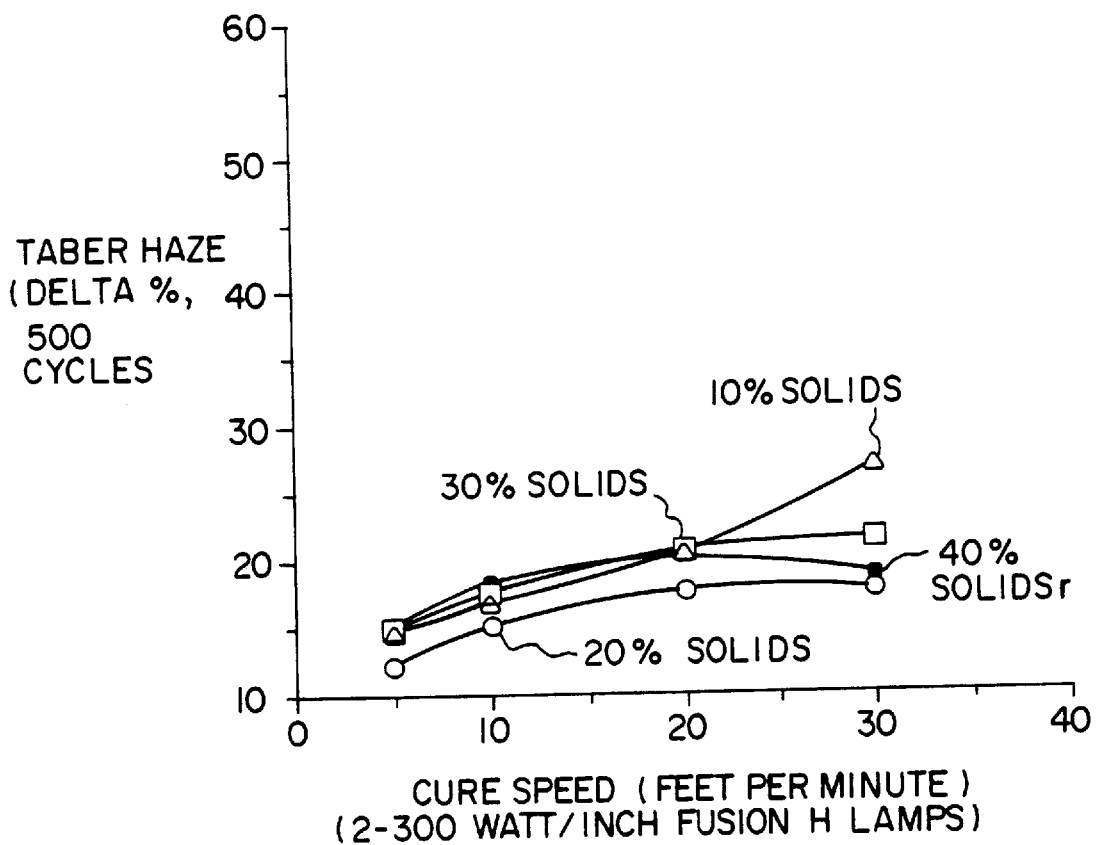
FIG. 4 is a graphical representation of the Taber haze data of Example 199.

The tintability data are plotted in FIG. 3.
The Taber Δ haze data are plotted in FIG. 4.

EXAMPLE 200

The formulations of Example 198 were coated on panels, cured and the coated panels immersed in a 9% BPI Black tint bath maintained at 90°–100° C. for varying amounts of time as set forth in the table below.

| Organic Tintability Additive (Parts by weight) | Conveyer Speed (Feet per Minute) | Tint Bath Immersion Time (minutes) | Tintability after dye bath immersion % transmission |
|---|---|---|---|
| 0.29 | 20 | 5 | 45.2 |
| 0.29 | 20 | 10 | 28.8 |
| 0.29 | 20 | 15 | 21.6 |
| 0.29 | 20 | 30 | 14.0 |
| 0.29 | 30 | 5 | 32.9 |
| 0.29 | 30 | 10 | 19.6 |
| 0.29 | 30 | 15 | 14.7 |
| 0.29 | 30 | 30 | 8.9 |
| 0.58 | 10 | 5 | 24.4 |
| 0.58 | 10 | 10 | 10.9 |
| 0.58 | 10 | 15 | 7.8 |
| 0.58 | 10 | 30 | 4.1 |
| 0.58 | 20 | 5 | 15.4 |
| 0.58 | 20 | 10 | 6.9 |
| 0.58 | 20 | 15 | 4.4 |
| 0.58 | 20 | 30 | 2.4 |
| 0.58 | 30 | 5 | 11.3 |
| 0.58 | 30 | 10 | 4.6 |
| 0.58 | 30 | 15 | 3.2 |
| 0.58 | 30 | 30 | 2.0 |
| 0.87 | 10 | 5 | 12.6 |
| 0.87 | 10 | 10 | 4.6 |
| 0.87 | 10 | 15 | 3.1 |
| 0.87 | 10 | 30 | 1.9 |
| 0.87 | 20 | 5 | 7.1 |
| 0.87 | 20 | 10 | 2.4 |
| 0.87 | 20 | 15 | 1.7 |
| 0.87 | 20 | 30 | 1.1 |
| 0.87 | 30 | 5 | 5.7 |
| 0.87 | 30 | 10 | 2.4 |
| 0.87 | 30 | 15 | 1.7 |
| 0.87 | 30 | 30 | 1.1 |

Figure 5:
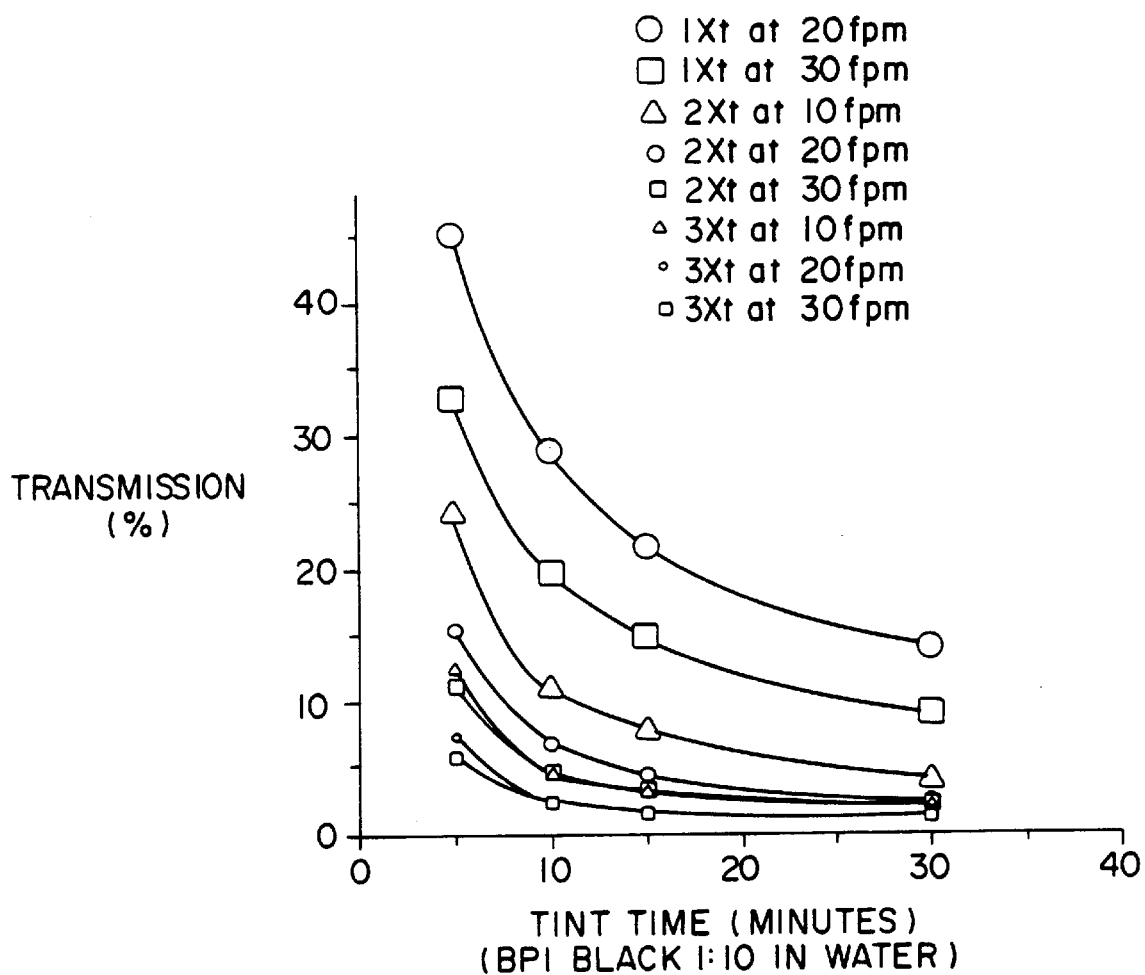
FIG. 5 is a graphical representation of the tintability data of Example 200.

These results are plotted in FIG. 5.

EXAMPLE 201

The procedure of Example 40 was repeated except that the Vicure 55 quantity was raised to 11.5 parts by weight and the quantity of IPA was raised to 301.8 parts by weight to produce Masterbatch 201.

EXAMPLE 202–208

9.2 parts by weight of Masterbatch 201 was mixed with varying amounts of the organic tintability additives as identified in the table below, applied to polycarbonate substrate as described in Examples 184–197, cured in one cure pass with a 20 feet per minute conveyer speed and tinted as described in said Examples.

| Example | Organic Tintability Additives | Amount Parts by weight | Top of Panel Haze (inches) | Tintability after dye bath 15 minutes immersion % transmission | Steel Wool Test |
|---|---|---|---|---|---|
| 202 | RR | 0.15 | 1 | 49.3 | OK |
| 203 | SS | 0.30 | 0.5 | 68.1 | Exc |
| 204 | C | 0.15 | 0.5 | 33.5 | Fair |
| 205 | E | 0.14 | 0.1 | 33.1 | Fair |
| 206 | A | 0.21 | 0.1 | 35.3 | Exc |
| 207 | QQ | 0.17 | 0.5 | 33.7 | Exc |
| 208 | PP | 0.15 | 1 | 44.4 | Exc |

The procedure of Examples 202–208 was repeated except that, in addition to the other components PETA was added in the amounts shown in Table 7, an additional amount of IPA was added as shown in Table 7 and to this was added the organic tintability additive in the amount set forth in Table 7. The coated substrates were 3 inch diameter injection molded polycarbonate ophthalmic lenses.

TABLE 7

| Example | Organic Tintability Additive | Amount Parts by weight | Additional IPA Parts by weight | PETA Parts by weight | Top of Panel Haze (inches) | Tintability after dye bath 15 minutes immersion % | Steel Wool Test |
|---|---|---|---|---|---|---|---|
| 209 | A | 0.25 | 2.2 | 0.3 | 2.5 | 42.3 | Fair |
| 210 | C | 0.25 | 2.2 | 0.3 | 3 | 41.6 | Poor |
| 211 | E | 0.25 | 2.2 | 0.3 | 3 | 35.6 | Poor |
| 212 | PP | 0.25 | 2.2 | 0.3 | 3 | 40.2 | Poor |
| 213 | QQ | 0.25 | 2.2 | 0.3 | 3 | 39.5 | Poor |
| 214 | A | 0.25 | 2.2 | 0.6 | 0 | 57.8 | Fair |
| 215 | C | 0.25 | 2.2 | 0.6 | 0 | 46.9 | Poor |
| 216 | E | 0.25 | 2.2 | 0.6 | 0 | 46.9 | Poor |
| 217 | PP | 0.25 | 2.2 | 0.6 | 0 | 59.2 ◊ | Exc |
| 218 | QQ | 0.25 | 2.2 | 0.6 | 0 | 60.0 ◊ | Exc |
| 219 | A | 0.75 | 2.2 | 0.6 | 0 | 28.9 ◊ | Poor |
| 220 | C | 0.75 | 2.2 | 0.6 | 0 | 29.9 ◊ | V Poor |
| 221 | E | 0.75 | 2.2 | 0.6 | 0 | 23.1 ◊ | V Poor |
| 222 | PP | 0.75 | 2.2 | 0.6 | 0 | 30.8 ◊ | Fair |
| 223 | QQ | 0.75 | 2.2 | 0.6 | 0 | 30.1 ◊ | Fair |
| 224C | A | 0.75 | 2.2 | 0.6 | 0 | 66.6 | Fair |
| 225C | C | 0.75 | 2.2 | 0.6 | 0 | 38.4 | Poor |
| 226C | E | 0.75 | 2.2 | 0.6 | 0 | 30.0 | Poor |
| 227C | PP | 0.75 | 2.2 | 0.6 | 0 | 41.7 | OK |
| 228C | QQ | 0.75 | 2.2 | 0.6 | 0 | 38.7 | OK |
| 229* | A | 0.48 | 2.5 | 1.2 | 0 | 24.2 ◊ | Exc |
| 230* | PP | 0.48 | 2.5 | 1.2 | 0 | 18.4 ◊ | Exc |
| 231** | A | 0.9 | 17.6 | 3.0 | 0 | 27.9 | OK |
| 232** | PP | 0.9 | 17.6 | 3.0 | 0 | 33.0 | Fair |
| 233*** | N | — | 1.2 | 0.6 | 0 | NT | Exc |
| 234* | N | — | 2.5 | 1.2 | 0 | NT | Exc |

TABLE 7-continued

| Example | Organic Tintability Additive | Amount Parts by weight | Additional IPA Parts by weight | PETA Parts by weight | Top of Panel Haze (inches) | Tintability after dye bath 15 minutes immersion % | Steel Wool Test |
|---|---|---|---|---|---|---|---|
| 235** | N | — | 17.6 | 3.0 | 0 | NT | Exc |

Examples 224C–228C are comparative examples which additionally contain 0.07 parts by weight of a cationic initiator, UV 6974 from Union Carbide Corporation, a mixed triaryl sulfonium hexafloroantimonate 50% solids in propylene carbonate.
*contains 0.09 parts by weight of additional Vicure 55
**contains 0.22 parts by weight of additional Vicure 55
***contains 0.05 parts by weight of additional Vicure 55
◊ Cracks at bottom of lens on tinting

EXAMPLES 236–243

The formulas of Examples 231 and 232 were coated on one side of an extruded 4 inch by 6 inch by ⅛ inch extruded LEXAN 9030 polycarbonate panels, let stand for two minutes in air at ambient room temperature, cured in one pass on a 20 foot per minute conveyer belt under 2–300 watt per inch Fusion H lamps positioned 2.1 inches above the belt and immersed for times set forth in the table below in a 9% BPI Black dye aqueous bath maintained between 90° and 100° C. The tinted samples were tested for tintability

| Example | Coating | Immersion time (minutes) | Tintability after dye bath immersion % transmission |
|---|---|---|---|
| 236 | 231 | 5 | 41.7 |
| 237 | 231 | 10 | 31.3 |
| 238 | 231 | 25 | 23.6 |
| 239 | 231 | 30 | 20.9 |
| 240 | 232 | 5 | 41.8 |
| 241 | 232 | 10 | 31.0 |
| 242 | 232 | 25 | 22.4 |
| 243 | 232 | 30 | 19.6 |

EXAMPLES 244 and 245

Compositions as follows were mixed together in a suitable vessel (quantities in parts by weight) applied to a substrate, cured and tinted as set forth in Examples 236–243:

|  | Example 244 | Example 245 |
|---|---|---|
| Masterbatch 1 | 2.88 | 2.88 |
| TMPTA | 1.44 | 1.44 |
| Vicure 55 | 0.33 | 0.33 |
| BYK 310 | 0.01 | 0.01 |
| UVR 6110 | 0.33 | 0.33 |
| IPA | 11.6 | 11.6 |
| UV 6974 | — | 0.24 |
| Taber Δ haze 300 cycles (%) | 9.5 | 14.0 |
| Tintability after dye bath 16 minutes immersion (%) | 37.9 | 51.0 |
| Steel Wool Test | Exc | Exc |

EXAMPLES 246–265

The coated and cured panels prepared as described in the earlier Examples 35–39 listed below were aged at 60° C. in a circulating air oven for the periods of time set forth below and then tinted as described in the earlier examples listed:

| Coated Panel (Example Number) | Aging period (days) | Tintability after dye bath 15 minute immersion (%) |
|---|---|---|
| 246 | 35 | 0 | 26.3 |
| 247 | 35 | 1.1 | 27.7 |
| 248 | 35 | 8 | 37.7 |
| 249 | 35 | 15 | 47.5 |
| 250 | 36 | 0 | 17.2 |
| 251 | 36 | 1.1 | 22.9 |
| 252 | 36 | 8 | 36.0* |
| 253 | 36 | 15 | 30.5 |
| 254 | 37 | 0 | 29.5 |
| 255 | 37 | 1.1 | 33.2 |
| 256 | 37 | 8 | 45.8 |
| 257 | 37 | 15 | 37.8 |
| 258 | 38 | 0 | 34.8 |
| 259 | 38 | 1.1 | 40.4 |
| 260 | 38 | 8 | 46.2 |
| 261 | 38 | 15 | 50.8 |
| 262 | 39 | 0 | 28.6 |
| 263 | 39 | 1.1 | 32.4 |
| 264 | 39 | 8 | 53.1 |
| 265 | 39 | 15 | 50.6 |

*Cracks on bottom of panel noted on tinting.

EXAMPLE 266

Masterbatch 266

The following ingredients were mixed together in a suitable vessel to form Masterbatch 266:

| Masterbatch 1 | 100 |
|---|---|
| TMPTA | 100 |
| Vicure 55 | 12 |
| BYK 310 | 0.7 |

EXAMPLES 267–302

To 100 parts of Masterbatch 266 the organic tintability additives set forth in the table below were and sufficient IPA was added to give the percent solids specified in the table. The coating composition thus obtained was applied to one side of a polycarbonate substrate, cured and tinted as set forth in Examples 236–243. Taber Δ haze 500 cycles, tintability after dye bath 15 minute immersion and steel wool abrasion were tested on the tinted specimens.

| Example | Organic Tintability Additive | Amount Parts by Weight | % Solids | Taber Δ haze 500 cycles % | Tintability after dye bath 15 minutes immersion % | Steel Wool Test |
|---|---|---|---|---|---|---|
| 267 | UU | 5 | 20 | 11.5 | 60.5 | NT |
| 268 | UU | 10 | 20 | 20.2 | 41.5 | NT |
| 269 | UU | 20 | 20 | 25.2 | 34.0 | NT |
| 270 | A | 5 | 20 | NT | 47.6 | NT |
| 271 | A | 10 | 20 | 15.5 | 21.2 | NT |
| 272 | N | — | 20 | 11.2 | 70.9 | NT |
| 273 | A | 10 | 20 | NT | 27.9 | NT |
| 274 | A | 15 | 20 | NT | 19.4 | NT |
| 275 | A | 20 | 20 | NT | 13.4 | NT |
| 276 | A | 50 | 20 | NT | 9.0 | NT |
| 277 | N | — | 20 | 8.6 | 72.0 | NT |
| 278 | A | 10 | 20 | 11.7 | 28.0 | NT |
| 279 | A | 15 | 20 | 20.4 | 15.0 | NT |
| 280 | UU | 10 | 20 | 9.6 | 36.8 | NT |
| 281 | UU | 15 | 20 | 17.7 | 23.6 | NT |
| 282 | A | 15 | 30 | 15.5 | 8.1 | NT |
| 283 | B | 10 | 20 | 11.4 | 28.7 | NT |
| 284 | B | 15 | 20 | 16.2 | 12.7 | NT |
| 285 | N | — | 20 | 6.8 | 72.8 | NT |
| 286 | O | 10 | 20 | 9.6 | 51.1 | Poor |
| 287 | O | 15 | 20 | 13.8 | 31.0 | Poor |
| 288 | B | 15 | 30 | NT | 12.6 | NT |
| 289 | N | — | 30 | NT | 76.8 | NT |
| 290 | A | 15 | 20 | NT | 14.1 | Poor |
| 291 | B | 15 | 20 | NT | 16.2 | Poor |
| 292 | A | 15 | 30 | NT | 10.8 | Poor |
| 2931 | B | 15 | 30 | NT | 13.6 | Poor |
| 294* | A | 15 | 20 | NT | 37.9 | Poor |
| 295 | A | 10 | 40 | 10.2 | 24.5 | NT |
| 296 | A | 0.5 | 40 | NT | 59.1 | NT |
| 297** | A | 10 | 40 | NT | 29.1 | NT |
| 298*** | A | 10 | 40 | NT | 27.4 | NT |
| 299 | A | 15 | 40 | 19.5 | 8.7 | NT |
| 300** | A | 15 | 40 | NT | 11.8 | NT |
| 301**** | A | 15 | 20 | 24.7 | 19.0 | OK |
| 302***** | A | 15 | 30 | 24.8 | 8.8 | OK |

*Cured in 3 passes
**6 parts by weight of Vicure 55 added
***12 parts by weight of Vicure 55 added
****1.8 parts by weight of Vicure 55 added
*****4.4 parts by weight of Vicure 55 added

EXAMPLES 303–309

To Masterbatch 1 in the amounts stated below, organic tintability additive A in the amounts set forth in the table below together with the other components set forth in the amounts stated in the table were added to make the formulations identified by example number. (Parts by weight except for % by weight where noted as %.) Percent solids was obtained by diluting the composition with an appropriate amount of IPA.

| Example | Masterbatch 1 | Organic tintability additive A | TMPTA | PETA | DIPETA* | VICURE 55 | % Solids |
|---|---|---|---|---|---|---|---|
| 303 | 1 | 0.5 | 2 | — | — | 7% | 29 |
| 304 | 2 | 0.5 | 1 | — | — | 7% | 29 |
| 305 | 1 | 0.5 | — | — | 2 | 6% | 28 |
| 306 | 1 | 0.5 | — | 1 | — | 6% | 30 |
| 307 | 1 | 0.5 | — | 2 | — | 6% | 30 |
| 308 | 1 | 0.7 | — | 3 | — | 6% | 30 |
| 309 | 1 | 0.5 | — | 3 | — | 6% | 30 |

*dipentaerythritol tetraacrylate

The data obtained in these examples are set forth below.

| Example | Taber Δ haze 300 cycles % | Tintability after dye bath 15 minutes immersion % | Steel Wool Test |
|---|---|---|---|
| 303 | 39.5 | 18.8 | OK |
| 304 | 10.7 | 8.2 | OK |
| 305 | 33.7 | 6.5* | NT |
| 306 | 29.1 | 4.5 | Poor |
| 307 | 17.6 | 9.6 | Poor |
| 308 | NT | 8.2 | Poor |
| 309 | NT | 36.4 | Poor |

While the invention has been explained in conjunction with specific embodiments and examples, those of ordinary skill in the art will appreciate that modification and variations can be made without departing from the scope of the present invention. The foregoing disclosure is not intended or to be construed to limit the present invention, or to otherwise exclude any other embodiments, adaptations, variations and equivalent compositions or methods, the present invention being limited only by the claims appended hereto and the equivalents thereof.

We claim:

1. A curable coating composition comprising:
   (A) an effective amount of a nonvolatile colloidal silica;
   (B) an effective amount of an acrylate or methacrylate compound, containing at least one functional group capable of reacting with said colloidal silica;
   (C) an effective amount of at least one monomer which contains two or more functional groups selected from the group consisting of acryloxy and methacryloxy groups;
   (D) a catalytic amount of a free radical initiator; and
   (E) an organic tintability additive which remains substantially unpolymerized after the remainder of the coating composition is cured.

2. The composition of claim 1 wherein the amount of component (A) is 100 parts by weight, the amount of component (B) is from 5 to 500 parts by weight, the amount of component (C) is from 10 to 800 parts by weight, the amount of component (D) is from 1 to 15 percent by weight of the total weight of component (A), component (B) and component (C) and the amount of component (E) is from 1 to 30 percent by weight of the total weight of component (A), component (B) and component (C).

3. A composition as claimed in claim 1 wherein component (B) is an acrylate or methacrylate functional silane.

4. A composition as claimed in claim 3 wherein said silane is 3-methacryloxypropyltrimethoxysilane.

5. A composition as claimed in claim 1 wherein component (C) is selected from the group consisting of hexanediol diacrylate, trimethylol propane triacrylate, or mixtures thereof.

6. A composition as claimed in claim 1 wherein component (D) is a free radical initiator selected from the group consisting of benzoin ethers, benzoyl esters, alpha-acryloxime esters, acetophenone derivatives, benzil ketals and aminoketone derivatives.

7. A composition as claimed in claim 6 wherein said free radical initiator is methyl benzoyl formate.

8. A composition as claimed in claim 1 which does not comprise any cationic initiator.

9. A composition as claimed in claim 1 wherein component (E) is a liquid at room temperature.

10. A composition of claim 9 wherein component (E) has a molecular weight which does not exceed about 2000.

11. A composition as claimed in claim 1 wherein component (E) has a functional group selected from the group consisting of epoxides, esters, ketones and ethers.

12. A composition as claimed in claim 11 wherein component (E) has an epoxy ester functional group.

13. A composition as claimed in claim 12 wherein component (E) is selected from the group consisting of dicycloaliphatic epoxy esters and dicycloaliphatic epoxy diesters.

14. A composition as claimed in claim 13 wherein component (E) is 3, 4-epoxycyclohexylmethyl-3,4-epoxycyclohexyl-carboxylate.

15. A composition of claim 1 wherein component (E) is free of acrylic functionality.

16. A composition of claim 1 wherein component (E) is free of vinyl functionality.

17. A composition of claim 1 which is curable by exposure to ultraviolet light and wherein component is substantially transparent to ultraviolet light.

18. A composition of claim 1 which is heat-curable and wherein component (D) is a peroxide.

19. A composition of claim 18 wherein component (E) is resorcinol monobenzoate.

20. A composition as claimed in claim 1 wherein component (B) is 3-methacryloxypropyl trimethoxysilane, component (C) is a mixture of hexanediol diacrylate and trimethylol propane triacrylate; component (D) is methyl benzoyl formate; and component (E) is 3,4-epoxycyclohexylmethyl-3,4-epoxycyclohexyl carboxylate and which composition does not comprise any cationic initiator.

* * * * *